United States Patent
Kataya et al.

(10) Patent No.: US 10,877,594 B2
(45) Date of Patent: Dec. 29, 2020

(54) TOUCH PANEL DEVICE, TOUCH PANEL DEVICE CONTROL METHOD, AND NON-TRANSITORY TANGIBLE COMPUTER-READABLE STORAGE MEDIUM HAVING THE PROGRAM STORED THEREIN

(71) Applicant: FANUC CORPORATION, Yamanashi (JP)

(72) Inventors: Hiroyuki Kataya, Yamanashi-ken (JP); Yasumichi Sakoda, Yamanashi-ken (JP); Kouji Hada, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/706,954

(22) Filed: Dec. 9, 2019

(65) Prior Publication Data
US 2020/0192518 A1    Jun. 18, 2020

(30) Foreign Application Priority Data
Dec. 14, 2018 (JP) .................. 2018-234313

(51) Int. Cl.
G06F 3/044 (2006.01)
G06F 3/041 (2006.01)

(52) U.S. Cl.
CPC .......... G06F 3/0416 (2013.01); G06F 3/0414 (2013.01)

(58) Field of Classification Search
CPC ............... G06F 3/044; G06F 3/041; G06F 2203/04103; G06F 1/16
See application file for complete search history.

(56) References Cited

U.S. PATENT DOCUMENTS

| | | | |
|---|---|---|---|
| 9,146,630 B2* | 9/2015 | Choi .................. | G06F 3/041 |
| 2013/0027333 A1* | 1/2013 | Nagata .................. | G06F 3/0418 345/173 |
| 2017/0024052 A1* | 1/2017 | Jota Costa .............. | G06F 3/044 |
| 2018/0081454 A1* | 3/2018 | Nakabayashi ...... | G06F 3/03545 |

FOREIGN PATENT DOCUMENTS

JP    2018106395 A    7/2018

* cited by examiner

*Primary Examiner* — Pegeman Karimi
(74) *Attorney, Agent, or Firm* — Robert P. Michal, Esq.; Carter, DeLuca & Farrell LLP (57) ABSTRACT

A touch panel device having a touch panel includes: a signal strength obtaining unit for obtaining the strength of signal at each node on the touch panel; an invalid node setting unit, wherein, among nodes located in an uppermost portion of the touch panel, if the number of nodes where the time for which the strength of the signal is maintained at a level equal to or greater than a threshold is equal to or longer than a first given time is equal to or greater than a first given number, the invalid node setting unit sets those nodes as invalid nodes; and an operated position obtaining unit, wherein, among nodes where the strength of the signal is equal to or greater than the threshold, the operated position obtaining unit obtains the position of a node other than the invalid nodes, as the operated position.

10 Claims, 11 Drawing Sheets

TOUCH PANEL DEVICE, TOUCH PANEL DEVICE CONTROL METHOD, AND NON-TRANSITORY TANGIBLE COMPUTER-READABLE STORAGE MEDIUM HAVING THE PROGRAM STORED THEREIN

CROSS-REFERENCE TO RELATED APPLICATION

This application is based upon and claims the benefit of priority from Japanese Patent Application No. 2018-234313 filed on Dec. 14, 2018, the contents of which are incorporated herein by reference.

BACKGROUND OF THE INVENTION

Field of the Invention

The present invention relates to a touch panel device having a touch panel that outputs signals corresponding to operated positions touched by an operating member, a touch panel device control method, and a non-transitory tangible computer-readable storage medium having stored therein a program for causing a computer to execute the touch panel device control method.

Description of the Related Art

Conventionally, techniques have been disclosed in which the touched position on a touch panel is detected by sensing change in capacitance based on change in capacitive coupling between the finger and electrodes at the touched position (e.g., Japanese Laid-Open Patent Publication No. 2018-106395).

SUMMARY OF THE INVENTION

However, the technique above may incorrectly detect the touched position since it also senses change in capacitance caused by fluid (liquid) adhering to the touch panel.

The present invention has been made in order to solve the problem above, and an object of the present invention is to provide a touch panel device that is capable of suppressing incorrect detection of the operated position due to adhesion of fluid on the touch panel, a control method for controlling the touch panel device, and a non-transitory tangible computer-readable storage medium having stored therein a program for causing a computer to execute the touch panel device control method.

A first aspect of the present invention is directed to a touch panel device having a touch panel that outputs a signal corresponding to an operated position by an operating member. The touch panel device includes: a signal strength obtaining unit configured to obtain strength of the signal at each of nodes arranged in an up and down direction and a right and left direction on the touch panel; an invalid node setting unit, wherein, among the nodes that are located in an uppermost portion of the touch panel, if the number of the nodes where the time for which the strength of the signal is maintained at a level equal to or greater than a threshold is equal to or longer than a first given time is equal to or greater than a first given number, the invalid node setting unit is configured to set the nodes where the time for which the strength of the signal is maintained at a level equal to or greater than the threshold is equal to or longer than the first given time, as invalid nodes, among the nodes located in the uppermost portion of the touch panel; and an operated position obtaining unit, wherein, among the nodes where the strength of the signal is equal to or greater than the threshold, the operated position obtaining unit is configured to obtain a position of a node other than the invalid nodes, as the operated position.

A second aspect of the present invention is directed to a method of controlling a touch panel device having a touch panel that outputs a signal corresponding to an operated position by an operating member. The touch panel device control method includes: a signal strength obtaining step of obtaining strength of the signal at nodes arranged in an up and down direction and a right and left direction on the touch panel; an invalid node setting step, wherein, among the nodes that are located in an uppermost portion of the touch panel, if the number of nodes where the time for which the strength of the signal is maintained at a level equal to or greater than a threshold is equal to or longer than a first given time is equal to or greater than a first given number, the invalid node setting step sets the nodes where the time for which the strength of the signal is maintained at the level equal to or greater than the threshold is equal to or longer than the first given time, as invalid nodes, among the nodes located in the uppermost portion of the touch panel; and an operated position obtaining step, wherein, among the nodes where the strength of the signal is equal to or greater than the threshold, the operated position obtaining step obtains a position of a node other than the invalid nodes, as the operated position.

A third aspect of the present invention is directed to a non-transitory tangible computer-readable storage medium having stored therein a program that causes a computer to execute the touch panel device control method according to the second aspect.

It is possible to suppress erroneous detection of an operated position due to adhesion of fluid on the touch panel.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

First Embodiment

[Configuration of Touch Panel Device]

Figure 1:
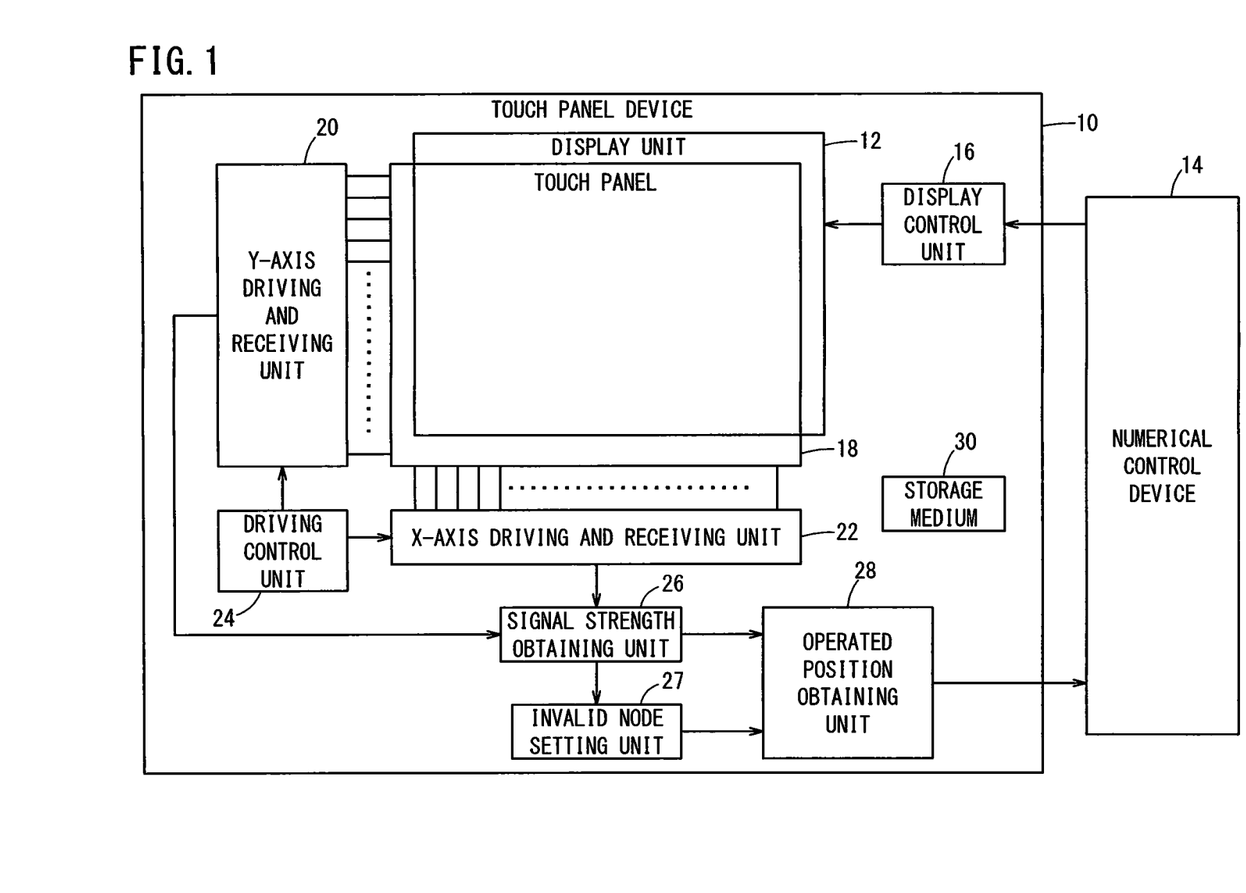
FIG. 1 is a block diagram showing the configuration of a touch panel device.

FIG. 1 is a block diagram showing the configuration of a touch panel device 10. The touch panel device 10 is an input device that allows a user to perform an operation by touching a screen of a display unit 12 where images etc. are displayed, by using an operating member such as a finger, stylus, etc. The touch panel device 10 of this embodiment is used as an input device for a numerical control device 14 for controlling a machine tool not shown.

The touch panel device 10 includes the display unit 12, a display control unit 16, a touch panel 18, a Y-axis driving and receiving unit 20, an X-axis driving and receiving unit 22, a driving control unit 24, a signal strength obtaining unit 26, an invalid node setting unit 27, and an operated position obtaining unit 28.

The display unit 12 can be a liquid-crystal display, for example, which displays icons through which a user can enter commands into the numerical control device 14, information indicating conditions of the machine tool sent from the numerical control device 14, and so on. The display control unit 16 controls the display unit 12 according to requests from the numerical control device 14.

The touch panel 18 is a transparent film-shaped member put or stuck on the screen of the display unit 12. The touch panel 18 of this embodiment is a capacitive touch panel. The description below shows an example in which the capacitive touch panel is a self-capacitance touch panel, but the touch panel 18 may be a mutual capacitance touch panel. The Y-axis driving and receiving unit 20 and the X-axis driving and receiving unit 22 are connected to the touch panel 18.

Figure 2:
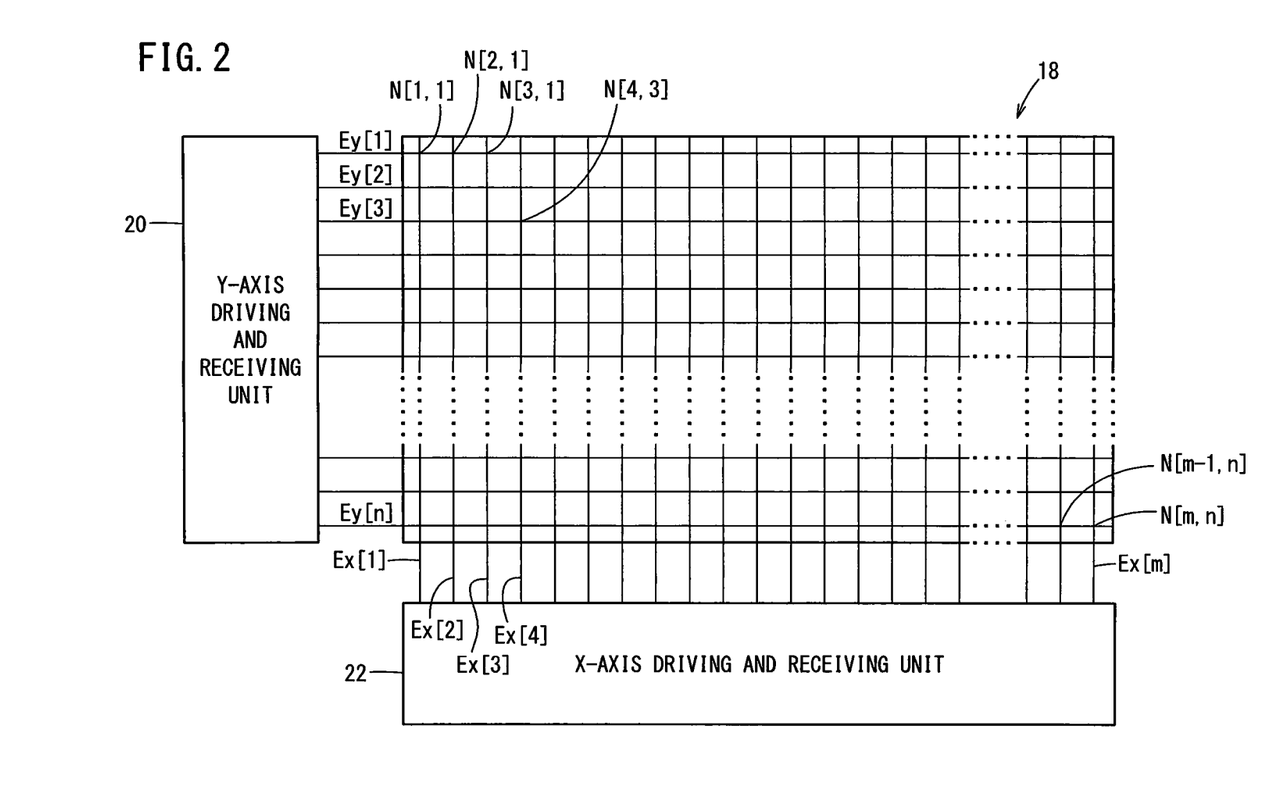
FIG. 2 is a schematic diagram showing a structure of the touch panel.

FIG. 2 is a schematic diagram showing a structure of the touch panel 18. The touch panel 18 includes X-axis electrodes Ex[1] to Ex[m] and Y-axis electrodes Ey[1] to Ey[n] made of indium tin oxide. The X-axis electrodes Ex[1] to Ex[m] each extend in the Y-axis direction in FIG. 2, and the electrodes Ex[1] to Ex[m] are arranged in the X-axis direction to form m-lines of electrodes. The Y-axis electrodes Ey[1] to Ey[n] each extend in the X-axis direction in FIG. 2, and the electrodes Ey[1] to Ey[n] are arranged in the Y-axis direction to form n-lines of electrodes.

The Y-axis driving and receiving unit 20 is connected to the Y-axis electrodes Ey[1] to Ey[n]. The Y-axis driving and receiving unit 20 sends drive pulse signals respectively to the Y-axis electrodes Ey[1] to Ey[n]. Further, the Y-axis driving and receiving unit 20 receives current signals respectively from the Y-axis electrodes Ey[1] to Ey[n]. Hereinafter, the Y-axis electrodes Ey[1] to Ey[n] may be collectively referred to as Y-axis electrodes Ey when it is not necessary to distinguish the lines thereof from each other.

The X-axis driving and receiving unit 22 is connected to the X-axis electrodes Ex[1] to Ex[m]. The X-axis driving and receiving unit 22 sends drive pulse signals respectively to the X-axis electrodes Ex[1] to Ex[m]. Further, the X-axis driving and receiving unit 22 receives current signals respectively from the X-axis electrodes Ex[1] to Ex[m]. Hereinafter, the X-axis electrodes Ex[1] to Ex[m] may be collectively referred to as X-axis electrodes Ex when it is not necessary to distinguish the lines thereof from each other.

Returning to FIG. 1, the driving control unit 24 controls the Y-axis driving and receiving unit 20 and the X-axis driving and receiving unit 22 to repeatedly send the drive pulse signals to the Y-axis electrodes Ey and the X-axis electrodes Ex.

From the current signals received by the Y-axis driving and receiving unit 20 respectively from the Y-axis electrodes Ey and the current signals received by the X-axis driving and receiving unit 22 respectively from the X-axis electrodes Ex, the signal strength obtaining unit 26 obtains the strengths of sense signals at nodes N[1, 1] to N[m, n] on the touch panel. The nodes N[1, 1] to N[m, n] may hereinafter be collectively referred to as nodes N when it is not necessary to distinguish them.

When the operating member is not in contact with the touch panel 18, i.e., when the touch panel 18 is not being operated, electric current flows between the Y-axis electrodes Ey and ground not shown, in accordance with the drive pulse signals. At this time, the amplitude of the voltage signal obtained by converting a current signal received by the Y-axis driving and receiving unit 20 is voltage V0. When the operating member is in contact with the touch panel 18, i.e., when the touch panel 18 is being operated, current flows also between the Y-axis electrodes Ey and the operating member in accordance with the drive pulse signals. Accordingly, the current flowing to the Y-axis electrodes Ey when the touch panel 18 is being operated is larger than when the touch panel 18 is not being operated. At this time, the voltage signal obtained by converting the current signal received by the Y-axis driving and receiving unit 20 is larger than the voltage V0. Using the voltage V0 as a reference voltage, the signal strength obtaining unit 26 obtains, as the strength of the sense signal at each Y-axis electrode Ey, a value corresponding to the difference |V−V0| between the voltage V0 and the voltage V obtained by converting the current of each Y-axis electrode Ey received by the Y-axis driving and receiving unit 20. In the same way, the signal strength obtaining unit 26 obtains the strength of the sense signal of each X-axis electrode Ex.

As shown in FIG. 2, each node N is located at an intersection of a Y-axis electrode Ey and an X-axis electrode Ex. The signal strength obtaining unit 26 specifies one node N that corresponds to a combination of a line of Y-axis electrode Ey from which the Y-axis driving and receiving unit 20 has received the current signal and a line of X-axis electrode Ex from which the X-axis driving and receiving unit 22 has received the current signal. Then, the signal strength obtaining unit 26 performs a calculation to obtain the strength of the sense signal at the specified node N on the basis of the strength of the sense signal at the Y-axis electrode Ey and the strength of the sense signal at the X-axis electrode Ex. For example, on the basis of the strength of the sense signal at the Y-axis electrode Ey[3] and the strength of the sense signal at the X-axis electrode Ex[4], the signal strength obtaining unit 26 calculates to obtain the strength of the sense signal at the node N[4, 3]. If the strength of the sense signal at the node N[4, 3] is equal to or greater than a threshold, then the position of the node N[4, 3] is determined to be the operated position operated (touched) by the operating member.

The invalid node setting unit 27 sets nodes N located at positions where the possibility of adhesion of cutting fluid (liquid) is high, as invalid nodes. A process by which the invalid node setting unit 27 sets invalid nodes will be described in detail later.

On the basis of the signal strength at each node N obtained by the signal strength obtaining unit 26, the operated position obtaining unit 28 obtains the position operated by the operating member. The operated position obtaining unit 28 obtains the position of a node N where the signal strength is equal to or greater than a threshold, as the position operated by the operating member. However, the operated position obtaining unit 28 does not obtain the positions of the invalid nodes as the operated position. A process by which the operated position obtaining unit 28 obtains the operated position will be described in detail later.

The display control unit 16, the driving control unit 24, the signal strength obtaining unit 26, the invalid node setting unit 27, and the operated position obtaining unit 28 are realized by a computer executing a program stored in a storage medium 30. The storage medium 30 is a non-transitory tangible computer-readable storage medium.

[Invalid Node Setting Processing]

Figure 3:
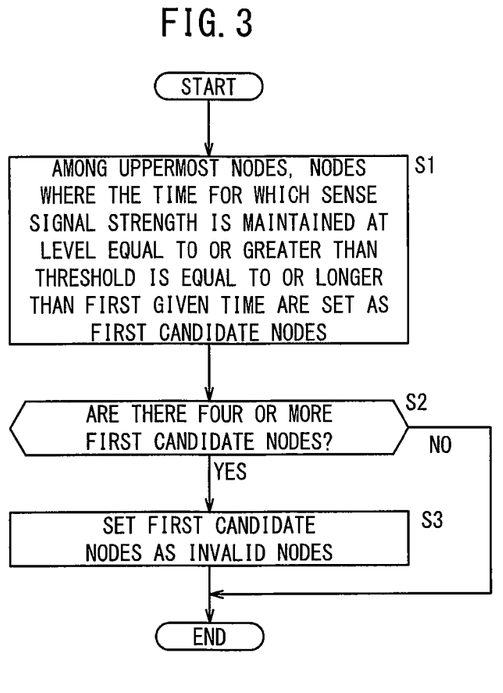
FIG. 3 is a flowchart illustrating the flow of an invalid node setting process that is performed by an invalid node setting unit.

FIG. 3 is a flowchart illustrating the flow of invalid node setting processing performed by the invalid node setting unit 27.

At step S1, among the nodes N[1, 1] to N[m, 1] that are located in an uppermost portion of the touch panel 18, the invalid node setting unit 27 sets, as first candidate nodes, nodes N at which the time for which the strength of the sense signal is maintained at a level equal to or greater than a threshold is equal to or longer than a first given time.

At step S2, the invalid node setting unit 27 determines whether or not there are four or more first candidate nodes (i.e., whether the number of the first candidate nodes four). If there are four or more first candidate nodes, the process moves to step S3; if there are less than four first candidate nodes, the invalid node setting processing is terminated.

At step S3, the invalid node setting unit 27 sets the first candidate nodes as invalid nodes and terminates the invalid node setting processing.

Figure 4:
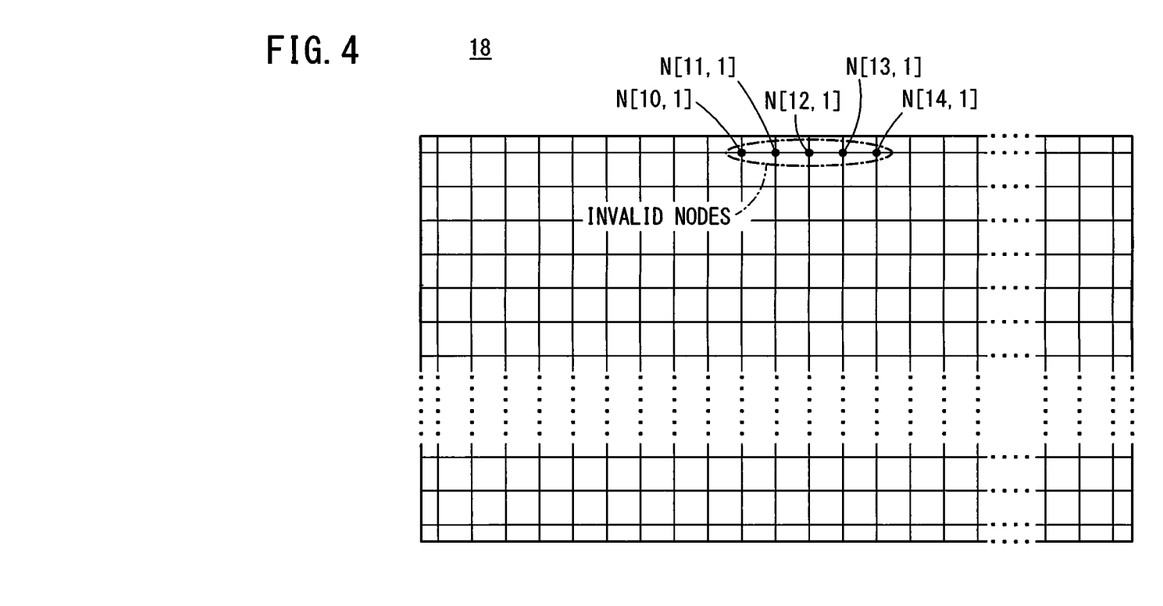
FIG. 4 is a diagram used to explain the invalid node setting process.

FIG. 4 is a diagram used to explain the invalid node setting processing. For example, if the time for which the strength of sense signal is maintained at a level equal to or greater than the threshold is equal to or longer than the first given time at each of the five nodes N[10, 1] to N[14, 1] located in an uppermost portion of the touch panel 18, then the nodes N[10, 1] to N[14, 1] are set as invalid nodes.

[Operated Position Obtaining Processing]

Figure 5:
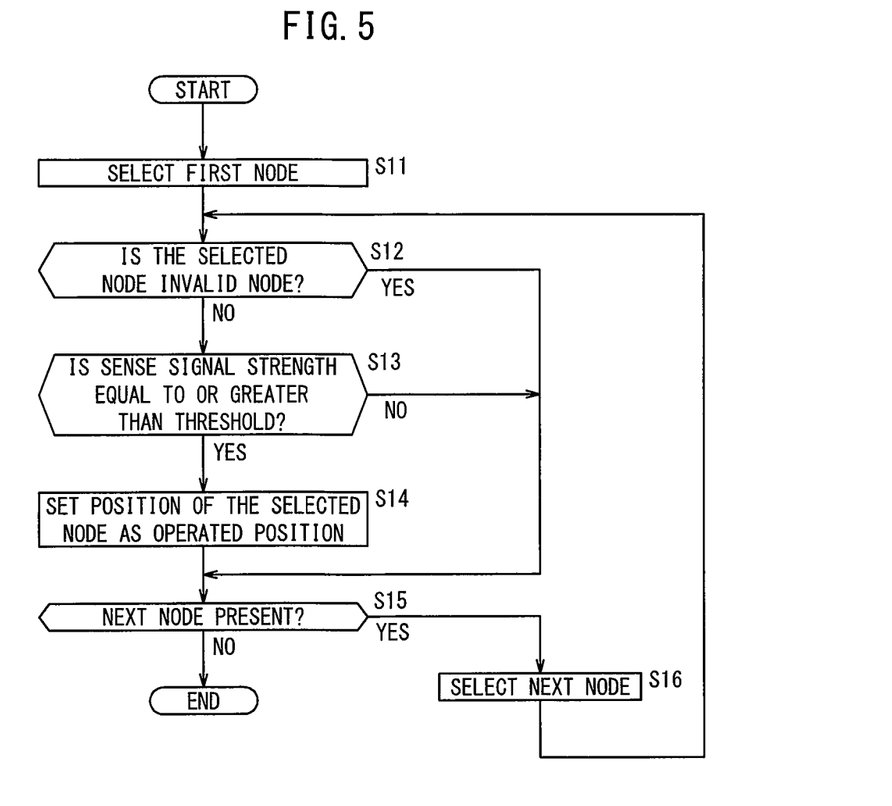
FIG. 5 is a flowchart illustrating the flow of an operated position obtaining process performed by an operated position obtaining unit.

FIG. 5 is a flowchart showing the flow of operated position obtaining processing performed by the operated position obtaining unit 28.

At step S11, the operated position obtaining unit 28 selects a first node N. The nodes N are selected in the order of node N[1, 1] → node N[2, 1] → node N[3, 1] → . . . → node N[m−1, n]→node N[m, n], for example.

At step S12, the operated position obtaining unit 28 determines whether the selected node N is an invalid node. If the selected node N is an invalid node, the process moves to step S15; if the selected node is not an invalid node, the process moves to step S13.

At step S13, the operated position obtaining unit 28 determines whether or not the sense signal strength corresponding to each pulse at the selected node N is equal to or greater than the threshold. If the sense signal strength is equal to or greater than the threshold, the process moves to step S14; if the sense signal strength is less than the threshold, the process moves to step S15.

At step S14, the operated position obtaining unit 28 sets the position of the selected node N as the operated position.

At step S15, the operated position obtaining unit 28 determines whether a next node N is present. If a next node N is present, the process moves to step S16; if no next node N is present, the operated position obtaining processing is terminated.

At step S16, the operated position obtaining unit 28 selects the next node N and returns to step S12.

[Functions and Effects]

In capacitive touch panels like the touch panel 18 of this embodiment, an edge portion of the touch panel is close to a part that is in contact with ground, and therefore cutting fluid may adhere thereto over a range from Y-axis electrodes Ey and X-axis electrodes Ex to ground. In this case, the current flowing through the Y-axis electrodes Ey and the X-axis electrodes Ex becomes larger and then the sense signal strengths will exceed the threshold, so that the position to which the cutting fluid adheres may be erroneously detected as an operated position.

Accordingly, in the touch panel device 10 of this embodiment, among nodes N located in an uppermost portion of the touch panel 18, the invalid node setting unit 27 sets nodes N where the time for which the sense signal strength is maintained at a level equal to or greater than the threshold is equal to or longer than the first given time, as first candidate nodes for invalid nodes. Then, if there are four (a first given number) or more first candidate nodes, the invalid node setting unit 27 sets the first candidate nodes as invalid nodes. Further, the operated position obtaining unit 28 obtains the position of nodes N other than the invalid nodes, as the operated position, from among the nodes N where the sense signal strength is equal to or greater than the threshold.

If cutting fluid in the form of mists adheres to a portion above the position where the touch panel 18 is placed, then the droplets of cutting fluid gradually become larger and drop downward to adhere to the touch panel 18. Thus, cutting fluid is likely to stay especially in an upper portion of the touch panel 18. Also, cutting fluid has relatively high viscosity, and therefore the cutting fluid will stay on the touch panel 18 longer than the duration of contact (touch) of the operating member with the touch panel 18. It is thus determined that cutting fluid is more possibly attached to the positions of first candidate nodes where the time for which the sense signal strength is maintained at a level equal to or greater than the threshold is equal to or longer than the first given time, among the nodes N located in the uppermost portion of the touch panel 18. Furthermore, the number of nodes N that are included in an area on the touch panel 18 touched by the operating member is usually three or less. Hence, if the number of the first candidate nodes is four or more, then it is determined that the possibility of adhesion of cutting fluid is still higher at the position of the first candidate nodes.

Thus, the touch panel device 10 of this embodiment suppresses erroneously detecting a position of adhesion of cutting fluid on the touch panel 18 as the operated position, and it is thus possible to improve the accuracy of detection of the operated position.

Second Embodiment

In a second embodiment, the invalid node setting processing partially differs from the invalid node setting processing of the first embodiment.

[Invalid Node Setting Processing]

Figure 6:
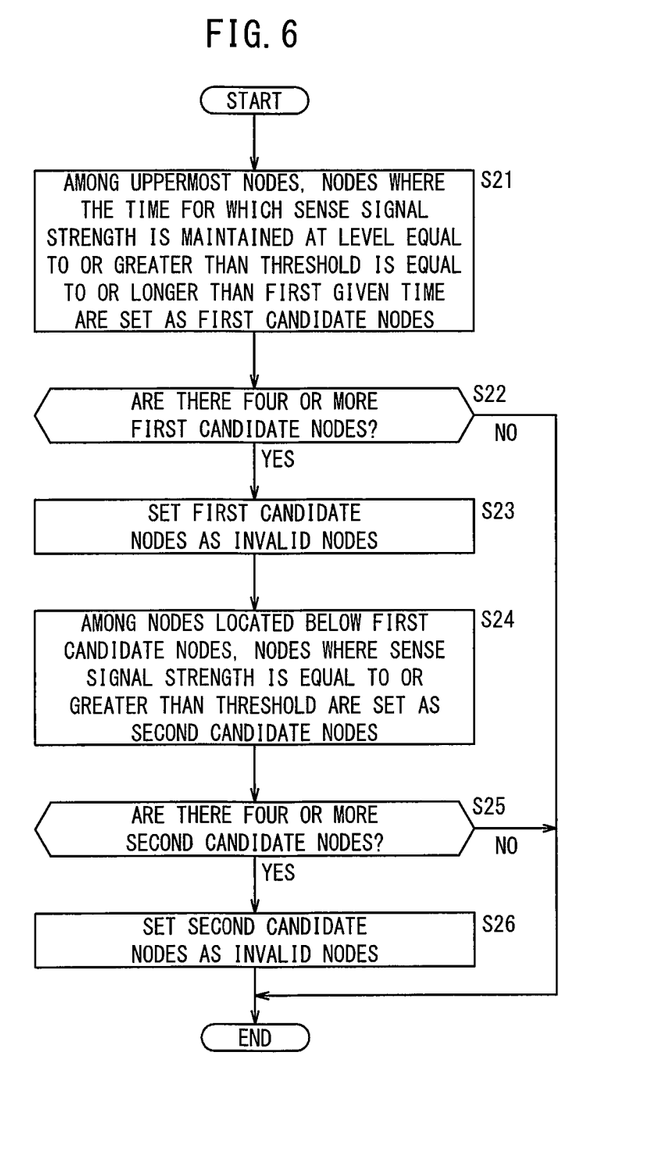
FIG. 6 is a flowchart illustrating the flow of an invalid node setting process performed by an invalid node setting unit.

FIG. 6 is a flowchart illustrating the flow of invalid node setting processing performed by an invalid node setting unit 27.

At step S21, among the uppermost nodes N[1, 1] to N[m, 1] on the touch panel 18, the invalid node setting unit 27 sets, as first candidate nodes, nodes N at which the time for which the strength of the sense signal is maintained at a level equal to or greater than the threshold is equal to or longer than a first given time.

At step S22, the invalid node setting unit 27 determines whether or not there are four or more first candidate nodes (i.e., whether the number of the first candidate nodes ≥ four). If there are four or more first candidate nodes, the process moves to step S23; if there are less than four first candidate nodes, the invalid node setting processing is terminated.

At step S23, the invalid node setting unit 27 sets the first candidate nodes as invalid nodes.

At step S24, among nodes N located below the first candidate nodes, the invalid node setting unit 27 sets, as second candidate nodes, nodes N at which the strength of the sense signal is equal to or greater than the threshold.

At step S25, the invalid node setting unit 27 determines whether or not there are four or more second candidate nodes. If there are four or more second candidate nodes, the process moves to step S26; if there are less than four second candidate nodes, the invalid node setting processing is put to an end.

At step S26, the invalid node setting unit 27 sets the second candidate nodes as invalid nodes and terminates the invalid node setting processing.

Figure 7:
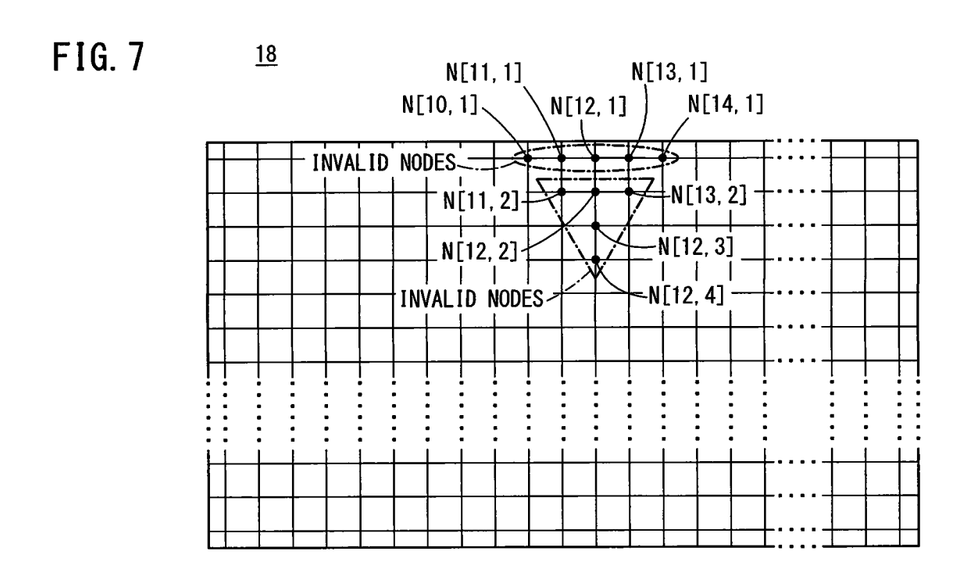
FIG. 7 is a diagram used to explain the invalid node setting process.

FIG. 7 is a diagram used to explain the invalid node setting processing. For example, if the time for which the sense signal strength has been equal to or greater than the threshold is equal to or longer than the first given time at each of the five nodes N[10, 1] to N[14, 1] located in the uppermost portion of the touch panel 18, then the nodes N[10, 1] to N[14, 1] are set as invalid nodes.

Furthermore, if the sense signal strength is equal to or greater than the threshold at the five nodes N[11, 2] to N[13, 2], N[12, 3], and N[12, 4] that are located below the nodes N[10, 1] to N[14, 1] set as invalid nodes, then the nodes N[11, 2] to N[13, 2], N[12, 3], and N[12, 4] are set as invalid nodes.

[Functions and Effects]

In the touch panel device 10 of this embodiment, among nodes N that are located below invalid nodes located in an uppermost portion of the touch panel 18, the invalid node setting unit 27 sets nodes N where the sense signal strength is equal to or greater than the threshold, as second candidate nodes. Then, if there are four (a second given number) or more second candidate nodes, the invalid node setting unit 27 sets the second candidate nodes as invalid nodes.

Cutting fluid adhering to an upper portion of the touch panel 18 is likely to move further downward on the touch panel. It is thus determined that cutting fluid is more possibly present at the position of second candidate nodes that have a sense signal strength equal to or greater than the threshold, among nodes N located below the invalid nodes located in the uppermost portion of the touch panel 18. Also, the number of nodes N that are contained in an area on the touch panel 18 touched by the operating member is usually three or less. Hence, if the number of second candidate nodes is four or more, then it is determined that the possibility of adhesion of cutting fluid is still higher at the position of the second candidate nodes.

Thus, the touch panel device 10 of this embodiment suppresses erroneously detecting a position of adhesion of cutting fluid on the touch panel 18 as the operated position, and it is thus possible to improve the accuracy of detection of the operated position.

Third Embodiment

Figure 8:
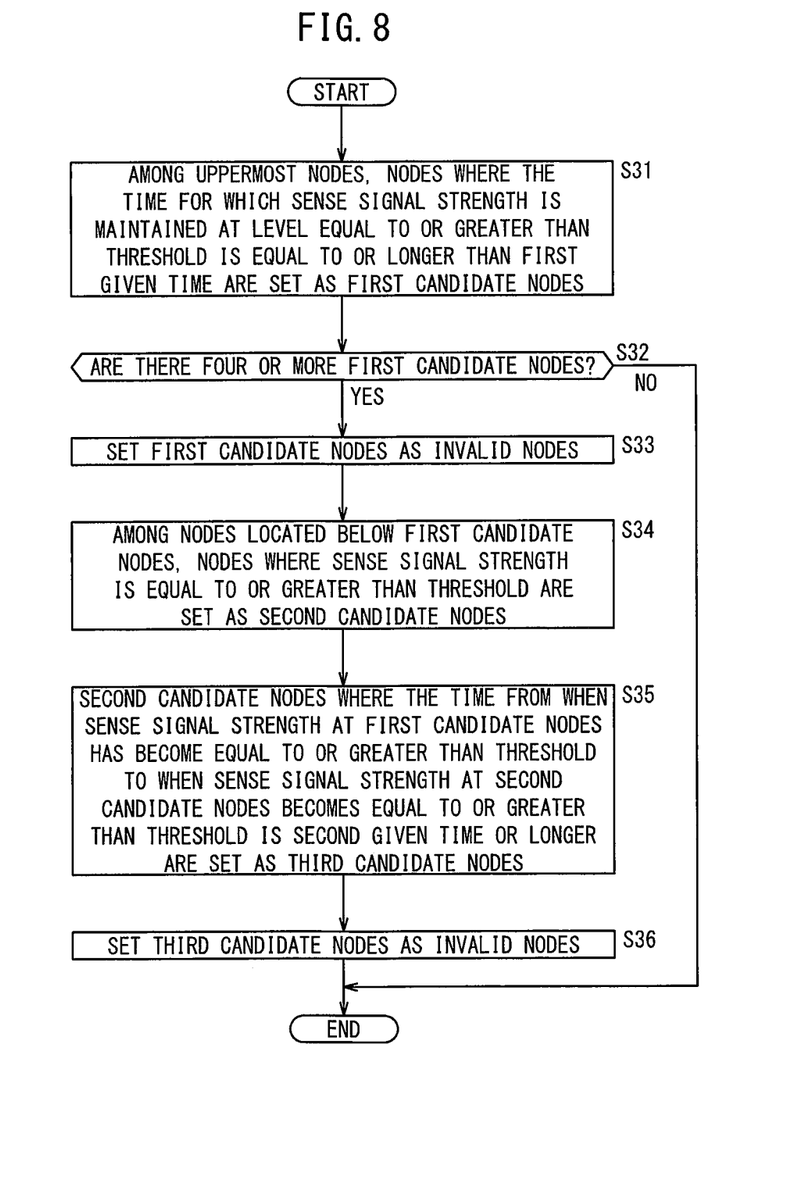
FIG. 8 is a flowchart illustrating the flow of an invalid node setting process performed by an invalid node setting unit.

FIG. 8 is a flowchart illustrating the flow of invalid node setting processing performed by an invalid node setting unit 27.

At step S31, among the uppermost nodes N[1, 1] to N[m, 1] on the touch panel 18, the invalid node setting unit 27 sets, as first candidate nodes, nodes N at which the time for which the strength of the sense signal is maintained at a level equal to or greater than a threshold is equal to or longer than a first given time.

At step S32, the invalid node setting unit 27 determines whether or not there are four or more first candidate nodes (i.e., whether the number of the first candidate nodes ≥ four). If there are four or more first candidate nodes, the process moves to step S33; if there are less than four first candidate nodes, the invalid node setting processing is terminated.

At step S33, the invalid node setting unit 27 sets the first candidate nodes as invalid nodes.

At step S34, among nodes N that are located below the first candidate nodes, the invalid node setting unit 27 sets, as second candidate nodes, nodes N where the strength of the sense signal is equal to or greater than the threshold.

At step S35, if the time from when the sense signal strength at the first candidate nodes has become equal to or greater than the threshold to when the sense signal strength at a second candidate node becomes equal to or greater than the threshold is equal to or longer than a second given time, then the invalid node setting unit 27 sets the second candidate node as a third candidate node. The value of the second given time need not necessarily be a fixed value but may be set so that the second given time becomes longer as a distance between the first candidate nodes and second candidate nodes becomes longer.

At step S36, the invalid node setting unit 27 sets the third candidate nodes as invalid nodes and terminates the invalid node setting processing.

[Functions and Effects]

In the touch panel device 10 of this embodiment, among nodes N that are located below invalid nodes located in an uppermost portion of the touch panel 18, the invalid node setting unit 27 sets nodes N at which the sense signal strength is equal to or greater than the threshold, as second candidate nodes. Then, the invalid node setting unit 27 sets a second candidate node as an invalid node if the time from when the sense signal strength at the first candidate nodes has become equal to or greater than the threshold to when the sense signal strength at the second candidate node becomes equal to or greater than the threshold is equal to or longer than the second given time.

Cutting fluid adhering to an upper portion of the touch panel 18 is likely to move further downward on the touch panel. It is thus determined that cutting fluid is more possibly present at the position of the second candidate nodes at which the sense signal strength is equal to or greater than the threshold, among nodes N located below the invalid nodes located in the uppermost portion of the touch panel 18. Also, cutting fluid has relatively high viscosity and so takes time to move from the position of the uppermost nodes N to the nodes N below them. Hence, if the time from when the sense signal strength at first candidate nodes has become equal to or greater than the threshold to when the sense signal strength at second candidate nodes becomes equal to or greater than the threshold is equal to or longer than the second given time, it is then determined that the possibility of adhesion of cutting fluid is still higher at the position of the second candidate nodes.

Thus, the touch panel device 10 of this embodiment suppresses erroneously detecting a position of adhesion of cutting fluid on the touch panel 18 as the operated position, and it is thus possible to improve the accuracy of detection of the operated position.

Fourth Embodiment

[Invalid Node Setting Processing]

Figure 9:
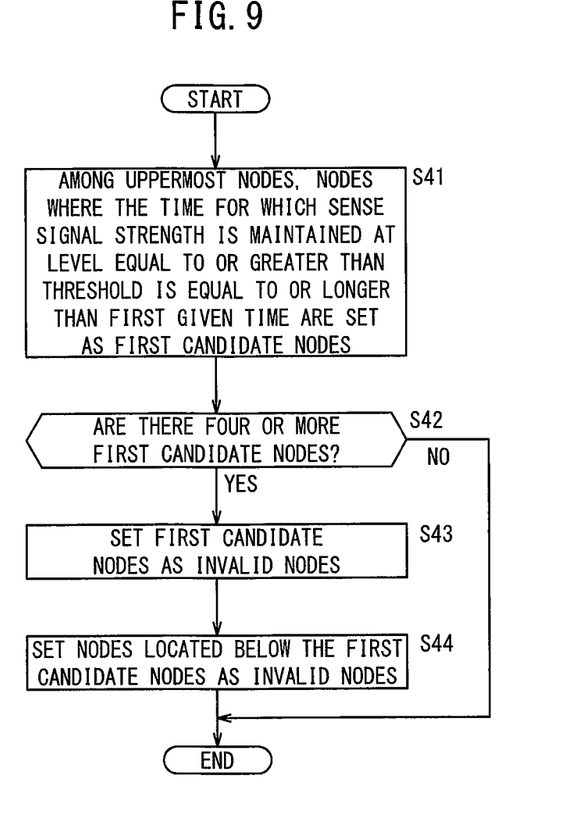
FIG. 9 is a flowchart illustrating the flow of an invalid node setting process performed by an invalid node setting unit.

FIG. 9 is a flowchart illustrating the flow of invalid node setting processing performed by an invalid node setting unit 27.

At step S41, among the uppermost nodes N[1, 1] to N[m, 1] on the touch panel 18, the invalid node setting unit 27 sets, as first candidate nodes, nodes N at which the time for which the strength of the sense signal is maintained at a level equal to or greater than a threshold is equal to or longer than a first given time.

At step S42, the invalid node setting unit 27 determines whether or not there are four or more first candidate nodes (i.e., whether the number of the first candidate nodes ≥ four). If there are four or more first candidate nodes, the process moves to step S43; if there are less than four first candidate nodes, the invalid node setting processing is terminated.

At step S43, the invalid node setting unit 27 sets the first candidate nodes as invalid nodes.

At step S44, nodes N that are located below the first candidate nodes are set as invalid nodes and the invalid node setting processing is put to an end.

Figure 10:
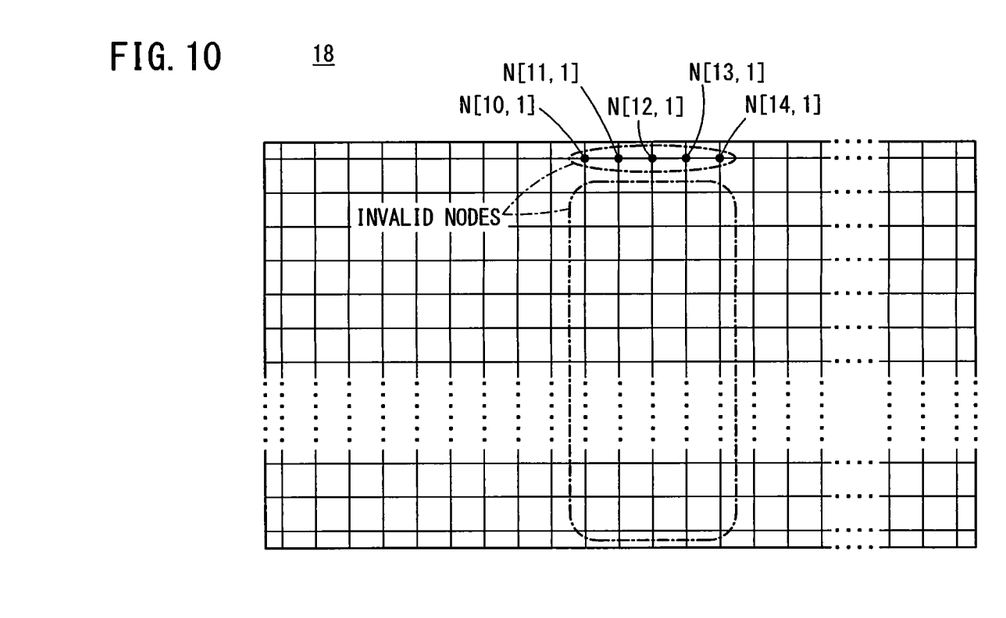
FIG. 10 is a diagram used to explain the invalid node setting process.

FIG. 10 is a diagram used to explain the invalid node setting processing. For example, if the time for which the strengths of sense signals have been equal to or greater than the threshold is equal to or longer than the first given time at each of the five nodes N[10, 1] to N[14, 1] located in an uppermost portion of the touch panel 18, then the nodes N[10, 1] to N[14, 1] are set as invalid nodes.

Furthermore, nodes N that are located below the nodes N[10, 1] to N[14, 1], which have been set as invalid nodes, are set as invalid nodes.

[Functions and Effects]

According to the touch panel device 10 of this embodiment, the invalid node setting unit 27 sets, as invalid nodes, nodes N that are located below invalid nodes located in the uppermost portion of the touch panel 18.

Cutting fluid adhering to an upper portion of the touch panel 18 is likely to move further downward on the touch panel. Accordingly, it is determined that it is likely that the cutting fluid adheres, or will adhere, to nodes N located below the invalid nodes located in the uppermost portion of the touch panel 18

Thus, the touch panel device 10 of this embodiment prevents erroneously detecting a position of adhesion of cutting fluid on the touch panel 18 as the operated position, and it is thus possible to improve the accuracy of detection of the operated position.

Fifth Embodiment

In a fifth embodiment, an area where operation by an operating member is impossible (a non-operable area 40) is set on the touch panel 18.

Figure 11:
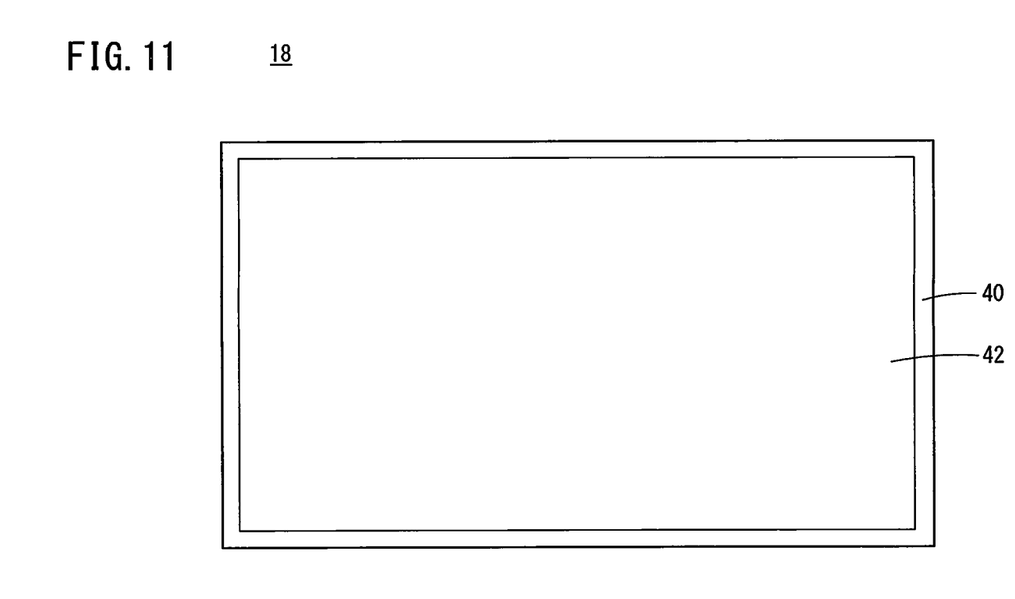
FIG. 11 is a schematic diagram illustrating a touch panel.

FIG. 11 is a schematic diagram illustrating a touch panel 18. The non-operable area 40 is provided at the top and bottom, left and right edges of the touch panel 18. The non-operable area 40 is provided in a region near the bezel of the touch panel device 10 which the operating member usually cannot touch. At least the uppermost nodes N[1, 1] to N[m, 1] are located in a portion of the non-operable area 40 that is positioned in the upper portion of the touch panel 18. Operation by the operating member is performed in an operable area 42 positioned inside the non-operable area 40.

In the touch panel device 10 of this embodiment, invalid nodes are set on the basis of the invalid node setting processing of the first to fourth embodiments.

[Functions and Effects]

In the touch panel device 10 of this embodiment, the uppermost nodes N[1, 1] to N[m, 1] on the touch panel 18 are located in the non-operable area 40 where operation by the operating member is disabled. It is determined that, if sense signal strength becomes equal to or greater than the threshold at one or some of the uppermost nodes N[1, 1] to N[m, 1], the possibility of adhesion of cutting fluid is still higher at the position(s) of the one node or those nodes N.

Thus, the touch panel device 10 of this embodiment prevents erroneous detection of the operated position, i.e., misjudging a position of adhesion of cutting fluid on the touch panel 18 as the operated position, and thus the accuracy of detection of the operated position can be improved.

Technical Ideas Obtained from Embodiments

The touch panel device (10) including a touch panel (18) that outputs a signal corresponding to an operated position by an operating member, includes: a signal strength obtaining unit (26) configured to obtain strength of the signal at each of nodes (N) arranged in an upper and down direction and a right and left direction on the touch panel; an invalid node setting unit (27), wherein, among the nodes that are located in an uppermost portion of the touch panel, if the number of nodes where the time for which the strength of the signal is maintained at a level equal to or greater than a threshold is equal to or longer than a first given time is equal to or greater than a first given number, the invalid node setting unit is configured to set the nodes where the time for which the strength of the signal is maintained at the level equal to or greater than the threshold is equal to or longer than the first given time, as invalid nodes, among the nodes located in the uppermost portion of the touch panel; and an operated position obtaining unit (28), wherein, among the nodes where the strength of the signal is equal to or greater than the threshold, the operated position obtaining unit is configured to obtain a position of a node other than the invalid nodes, as the operated position. It is thus possible to prevent erroneously detecting a position of adhesion of fluid (liquid) on the touch panel as the operated position, and thus the accuracy of detection of the operated position in the touch panel device can be improved.

In the touch panel device above, among the nodes that are located below the invalid nodes located in the uppermost portion of the touch panel, if the number of nodes where the strength of the signal is equal to or greater than the threshold is equal to or greater than a second given number, the invalid node setting unit may set the nodes where the strength of the signal is equal to or greater than the threshold, as invalid nodes, among the nodes located below the invalid nodes located in the uppermost portion of the touch panel. It is thus possible to suppress erroneously detecting a position of adhesion of fluid on the touch panel as the operated position, and thus the accuracy of detection of the operated position in the touch panel device can be improved.

In the touch panel device above, among the nodes that are located below the invalid nodes located in the uppermost portion of the touch panel, if the time from when the strength of the signal at the invalid nodes located in the uppermost portion of the touch panel has become equal to or greater than the threshold to when the strength of the signal at a node that is located below the invalid nodes becomes equal to or greater than the threshold is equal to or longer than a second given time, the invalid node setting unit may set the node located below the invalid nodes, as an invalid node. It is thus possible to suppress erroneously detecting a position of adhesion of fluid on the touch panel as the operated position, and thus the accuracy of detection of the operated position in the touch panel device can be improved.

In the touch panel device above, the invalid node setting unit may set, as invalid nodes, nodes that are located below the invalid nodes located in the uppermost portion of the touch panel, among the nodes. It is thus possible to prevent erroneously detecting a position of adhesion of fluid on the touch panel as the operated position, thus improving the accuracy of detection of the operated position in the touch panel device.

In the touch panel device above, a non-operable area (40) where operation by the operating member is disabled may be set in an upper portion of the touch panel, and the nodes located in the uppermost portion of the touch panel may be located in the non-operable area. It is thus possible to suppress erroneously detecting a position of adhesion of fluid on the touch panel as the operated position, and thus the accuracy of detection of the operated position in the touch panel device can be improved.

A method of controlling a touch panel device (10) including a touch panel (18) that outputs a signal corresponding to an operated position by an operating member, includes: a signal strength obtaining step of obtaining strength of the signal at each of nodes arranged in an up and down direction and a right and left direction on the touch panel; an invalid node setting step, wherein, among the nodes that are located in an uppermost portion of the touch panel, if the number of nodes where the time for which the strength of the signal is maintained at a level equal to or greater than a threshold is equal to or longer than a first given time is equal to or greater than a first given number, the invalid node setting step sets the nodes where the time for which the strength of the signal is maintained at the level equal to or greater than the threshold is equal to or longer than the first given time, as invalid nodes, among the nodes located in the uppermost portion of the touch panel; and an operated position obtaining step, wherein, among the nodes where the strength of the signal is equal to or greater than the threshold, the operated position obtaining step obtains a position of a node other than the invalid nodes, as the operated position. It is thus possible to suppress erroneously detecting a position of adhesion of fluid on the touch panel as the operated position, and thus the accuracy of detection of the operated position in the touch panel device can be improved.

In the touch panel device control method above, among the nodes that are located below the invalid nodes located in the uppermost portion of the touch panel, if the number of nodes where the strength of the signal is equal to or greater than the threshold is equal to or greater than a second given number, the invalid node setting step may set the nodes where the strength of the signal is equal to or greater than the threshold, as invalid nodes, among the nodes located below the invalid nodes located in the uppermost portion of the touch panel. It is thus possible to suppress erroneously detecting a position of adhesion of fluid on the touch panel as the operated position, and thus the accuracy of detection of the operated position in the touch panel device can be improved.

In the touch panel device control method above, among the nodes that are located below the invalid nodes located in the uppermost portion of the touch panel, if the time from when the strength of the signal at the invalid nodes located in the uppermost portion of the touch panel has become equal to or greater than the threshold to when the strength of the signal at a node that is located below the invalid nodes becomes equal to or greater than the threshold is equal to or longer than a second given time, the invalid node setting step may set the node located below the invalid nodes as an invalid node. It is thus possible to suppress erroneously detecting a position of adhesion of fluid on the touch panel as the operated position, and thus the accuracy of detection of the operated position in the touch panel device can be improved.

In the touch panel device control method above, the invalid node setting step may set, as invalid nodes, nodes that are located below the invalid nodes located in the uppermost portion of the touch panel, among the nodes. It is thus possible to prevent erroneously detecting a position of adhesion of fluid on the touch panel as the operated position, and thus the accuracy of detection of the operated position in the touch panel device can be improved.

A program that causes a computer to execute the touch panel device (10) control method above is provided. It is thus possible to suppress erroneously detecting a position of adhesion of fluid on the touch panel as the operated position, and thus the accuracy of detection of the operated position in the touch panel device can be improved.

A non-transitory tangible computer-readable storage medium (30) having stored therein a program that causes a computer to execute the touch panel device (10) control method above is provided. It is thus possible to suppress erroneously detecting a position of adhesion of fluid on the touch panel as the operated position, and thus the accuracy of detection of the operated position of the touch panel device can be improved.

The present invention is not particularly limited to the embodiment described above, and various modifications are possible without departing from the essence and gist of the present invention.

What is claimed is:

1. A touch panel device including a touch panel that outputs a signal corresponding to an operated position by an operating member, comprising:
a computer having instructions stored therein, that when executed cause the touch panel device to:
obtain strength of the signal at each of nodes arranged in an up and down direction and a right and left direction on the touch panel;
wherein, set nodes among the nodes that are located in an uppermost portion of the touch panel as invalid nodes if, for a first given number or more of the nodes in the uppermost portion of the touch panel, the strength of the signal is maintained at a level equal to or greater than a threshold for a time that is equal to or longer than a first given time; and
obtain a position of a node other than the invalid nodes, among the nodes where the strength of the signal is equal to or greater than the threshold, as the operated position.

2. The touch panel device according to claim 1, wherein the touch panel device is configured to set nodes among the nodes that are located below the invalid nodes located in the uppermost portion of the touch panel as invalid nodes if, for a second given number or more of the nodes located below the invalid nodes in the uppermost portion of the touch panel, the strength of the signal is equal to or greater than the threshold.

3. The touch panel device according to claim 1, wherein, among the nodes that are located below the invalid nodes located in the uppermost portion of the touch panel, if a time from when the strength of the signal at the invalid nodes located in the uppermost portion of the touch panel has become equal to or greater than the threshold to when the strength of the signal at a node that is located below the invalid nodes becomes equal to or greater than the threshold is equal to or longer than a second given time, the touch panel device is configured to set the node located below the invalid nodes, as an invalid node.

4. The touch panel device according to claim 1, wherein the touch panel device is configured to set, as invalid nodes, nodes that are located below the invalid nodes located in the uppermost portion of the touch panel, among the nodes.

5. The touch panel device according to claim 4,
wherein a non-operable area where operation by the operating member is disabled is set in an upper portion of the touch panel, and
the nodes located in the uppermost portion of the touch panel are located in the non-operable area.

6. A method of controlling a touch panel device including a touch panel that outputs a signal corresponding to an operated position by an operating member, the method comprising:
a signal strength obtaining step of obtaining strength of the signal at each of nodes arranged in an up and down direction and a right and left direction on the touch panel;
an invalid node setting step, wherein, among the nodes that are located in an uppermost portion of the touch panel, if a number of nodes where a time for which the strength of the signal is maintained at a level equal to or greater than a threshold is equal to or longer than a first given time is equal to or greater than a first given number, the invalid node setting step sets the nodes where the time for which the strength of the signal is maintained at the level equal to or greater than the threshold is equal to or longer than the first given time, as invalid nodes, among the nodes located in the uppermost portion of the touch panel; and
an operated position obtaining step, wherein, among the nodes where the strength of the signal is equal to or greater than the threshold, the operated position obtaining step obtains a position of a node other than the invalid nodes, as the operated position.

7. The touch panel device control method according to claim 6, wherein, among the nodes that are located below the invalid nodes located in the uppermost portion of the touch panel, if a number of nodes where the strength of the signal is equal to or greater than the threshold is equal to or greater than a second given number, the invalid node setting step sets the nodes where the strength of the signal is equal to or greater than the threshold, as invalid nodes, among the nodes located below the invalid nodes located in the uppermost portion of the touch panel.

8. The touch panel device control method according to claim 6, wherein, among the nodes that are located below the invalid nodes located in the uppermost portion of the touch panel, if a time from when the strength of the signal at the invalid nodes located in the uppermost portion of the touch panel has become equal to or greater than the threshold to when the strength of the signal at a node that is located below the invalid nodes becomes equal to or greater than the threshold is equal to or longer than a second given time, the invalid node setting step sets the node located below the invalid nodes, as an invalid node.

9. The touch panel device control method according to claim 6, wherein the invalid node setting step sets, as invalid nodes, nodes that are located below the invalid nodes located in the uppermost portion of the touch panel, among the nodes.

10. A non-transitory tangible computer-readable storage medium having stored therein a program that causes a computer to execute the touch panel device control method according to claim 6.

* * * * *